United States Patent [19]

King et al.

[11] 4,042,364
[45] Aug. 16, 1977

[54] CLEANING APPARATUS FOR CONVEYOR ROLLS

[75] Inventors: Roger P. King, Waterville; John W. Grosskopf, Jr.; Francis C. Bondelier, Jr., both of Perrysburg, all of Ohio

[73] Assignee: Libbey-Owens-Ford Company, Toledo, Ohio

[21] Appl. No.: 674,834

[22] Filed: Apr. 8, 1976

[51] Int. Cl.$^2$ ................. C03B 13/18; C03B 18/02
[52] U.S. Cl. ..................... 65/168; 65/182 R; 15/256.52; 15/256.53
[58] Field of Search ............... 65/27, 168, 182 R; 15/256.51, 256.52, 256.53

[56] References Cited
U.S. PATENT DOCUMENTS

| | | | |
|---|---|---|---|
| 1,889,838 | 12/1932 | Norman | 15/256.52 UX |
| 3,309,993 | 3/1967 | Grembecki et al. | 15/256.52 X |
| 3,481,727 | 12/1969 | Dickinson et al. | 65/168 |

Primary Examiner—Arthur D. Kellogg
Attorney, Agent, or Firm—Collins, Oberlin & Darr

[57] ABSTRACT

Apparatus for removing uneven and crusty deposits from and burnishing the surfaces of conveyor rolls employed in the manufacture of flat glass by the float process. The cleaning apparatus is provided with a rotating annular brush which is yieldingly urged against the cylindrical surfaces of the conveyor rolls which are employed to lift a newly formed glass ribbon from a molten metal bath and convey it through an annealing lehr. The brush is reciprocably movable throughout the length of the working surfaces of the conveyor rolls.

15 Claims, 13 Drawing Figures

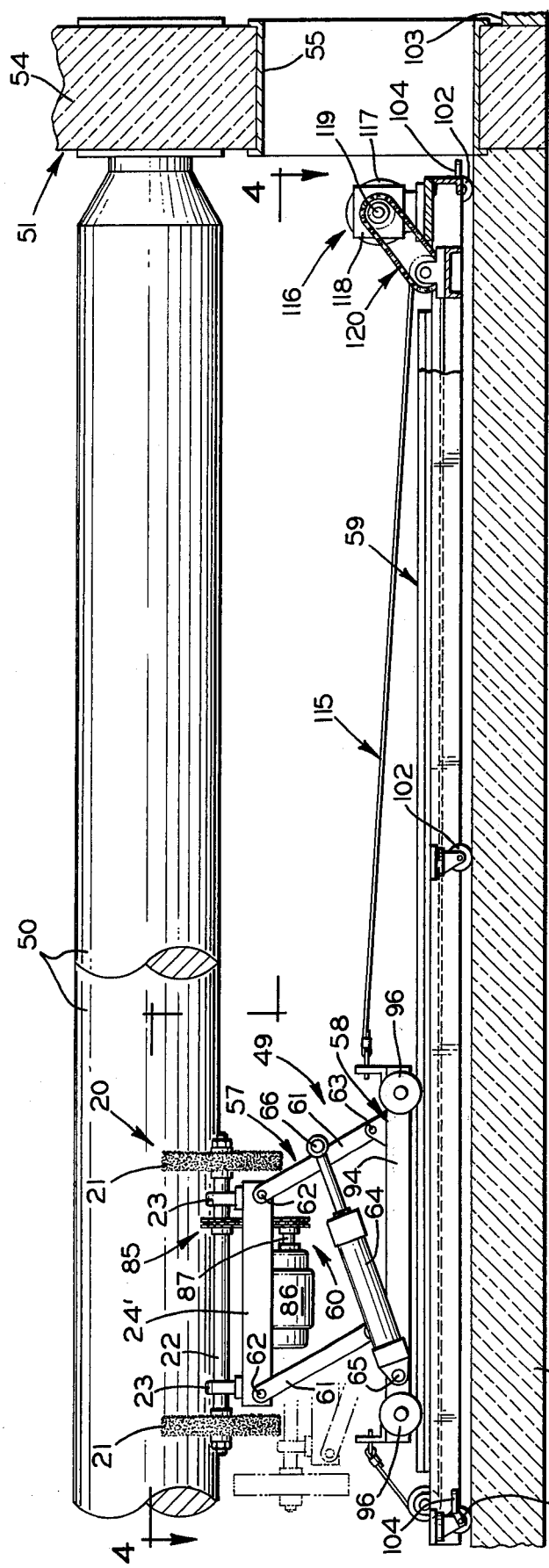
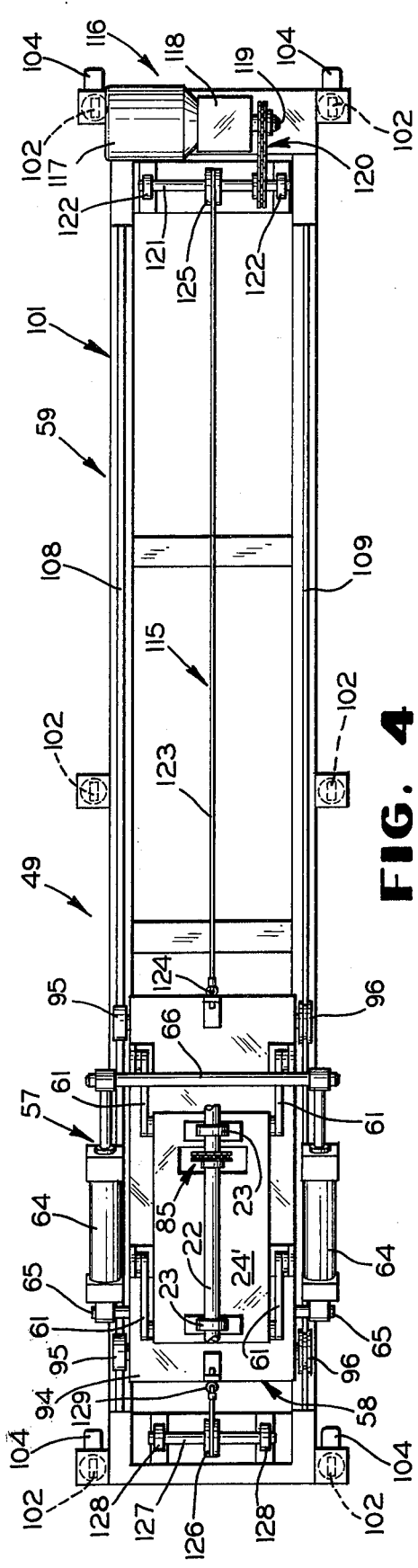
FIG. 3
FIG. 4

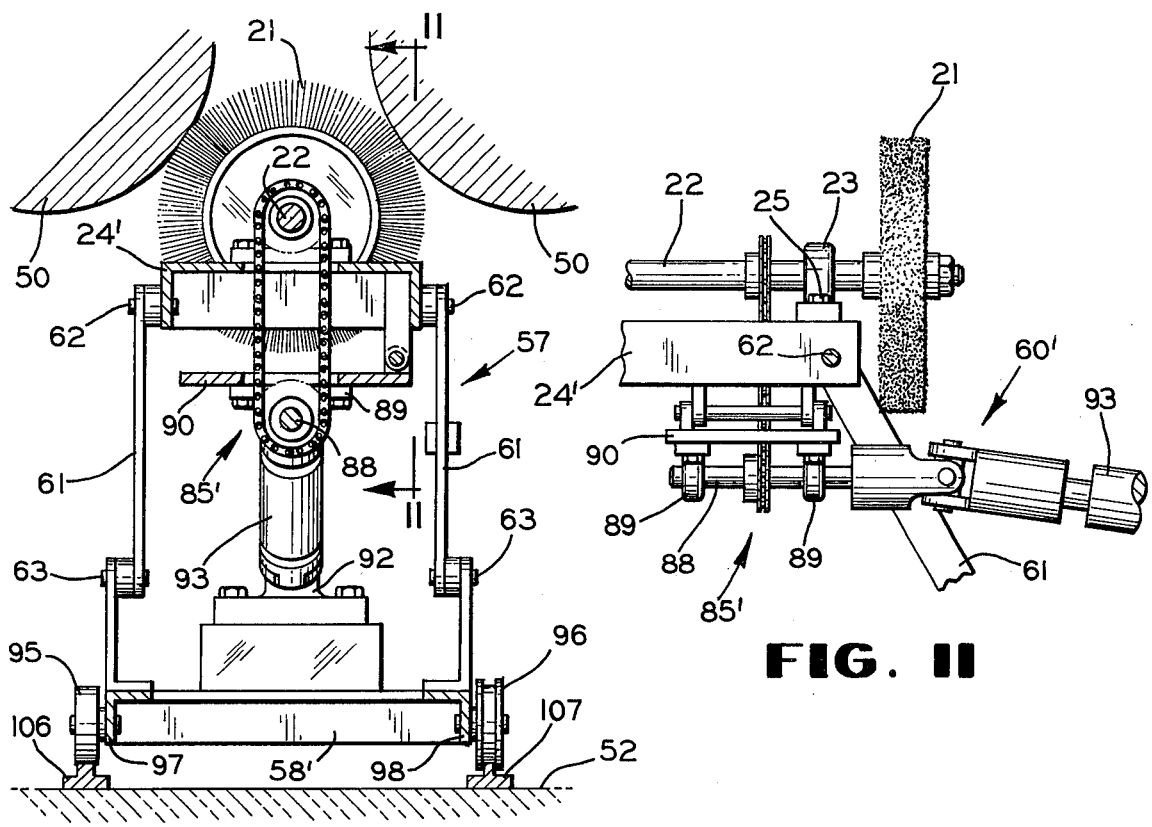
FIG. 10
FIG. 11
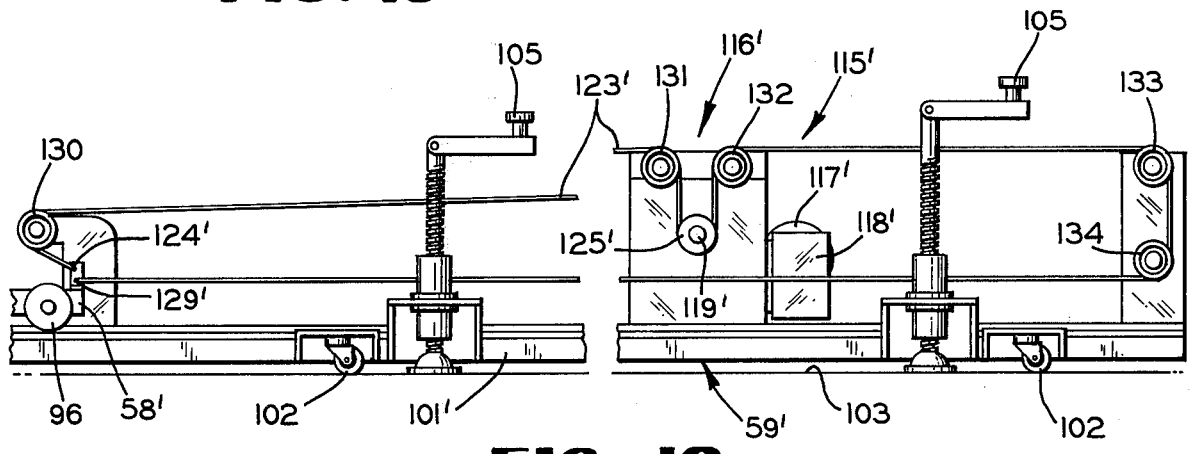
FIG. 12
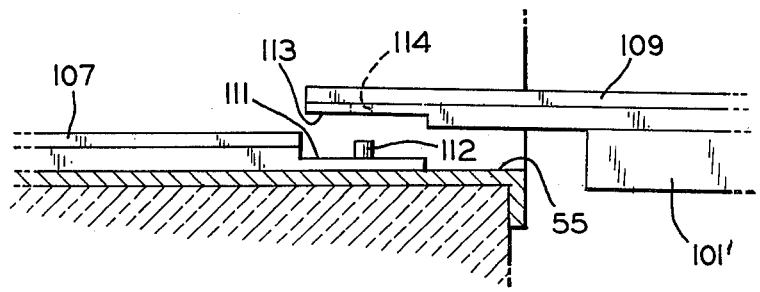
FIG. 13

CLEANING APPARATUS FOR CONVEYOR ROLLS

BACKGROUND OF THE INVENTION

1. Field of the Invention

This invention generally relates to the quality of flat glass produced by the float process and, more particularly, to a cleaning apparatus for removing uneven and crusty deposits from the surfaces of conveying rolls employed in such process.

2. Description of the Prior Art

A conventional float apparatus for producing float glass is illustrated and described in U.S. Pat. No. 3,083,551, issued on Apr. 2, 1963. As there explained, the float process involves the delivery of molten glass at a controlled rate onto a bath of molten metal such as tin or an alloy of tin, and advancement thereof along the surface of the bath under thermal and mechanical conditions which assure that (1) a layer of molten glass will be established on the molten metal bath, (2) from this molten glass layer there will develop on the surface of the metal bath a buoyant body of molten glass of stable thickness, and (3) as this glass body of stable thickness develops, it is continually advanced in ribbon form, along the bath and sufficiently cooled to permit its being taken from the bath at the exit end thereof by lift-out conveyor rolls. The newly formed ribbon of glass is then advanced through an annealing lehr on driven conveyor rolls which provide the tractive force to draw the glass ribbon along the metal bath. The glass ribbon is at an elevated temperature as it leaves the exit end of the metal bath and enters the entrance end of the annealing lehr and, accordingly, it is in a soft or plastic condition.

Glass produced by the above-described process is of high quality and is said to have fire-polished surfaces. However, because the newly formed glass ribbon is in a plastic condition as it leaves the metal bath and enters the annealing lehr, it is subject to a defect known in the art as "roll print". Roll print, characterized by broad band distortion such as random surface rub marks, fissures, and in some cases even fractures, is caused by the mechanical contact of the glass ribbon with lift-out and lehr conveyor rolls which have uneven and crusty deposits on their surfaces which imprint on the soft undersurface of the newly formed glass ribbon.

In the case of the lift-out rolls, the uneven and crusty deposits are thought to be formed on the surfaces thereof by (1) the carryover of dross adhering on the glass ribbon from the molten bath which is deposited on the rolls, (2) vapors from the bath which condense and deposit on the rolls and, (3) carbon deposits which adhere to the rolls from he elongated carbon blades of the sealing means conventionally employed to seal the exit end of the float chamber from the surrounding atmosphere.

In the case of the lehr conveyor rolls, especially these rolls adjacent the lehr entrance, the uneven and crusty deposits are thought to be formed on the surfaces thereof by the carryover of tin enriched vapors which condense and deposit themselves on the rolls as a crusty layer of non-uniform thickness as well as the carryover of dross and other foreign matter adhering on the soft undersurface of the glass ribbon.

Attempts have been made in the past to remove impacted crusty deposits drom the surfaces of such conveyor rolls in situ. For example, U.S. pat. No. 3,337,320, issued on Aug. 22, 1967, teaches a method of removing deposits from the surfaces of lehr rolls by steam and U.S. pat. No. 3,481,727, issued on Dec. 2, 1969, teaches the use of a reciprocating abrasive tool for abrading and brushing the crusty deposits from the surfaces of conveyor rolls. However, the methods and devices disclosed in these patents have not been entirely satisfactory in that the steam device will not remove heavily impacted crusty deposits from the roll surfaces and the abrading device may damage the roll surface itself. Also, the abrading device is subject to the disadvantage that the abrasive blocks employed load up with the hard crusty debris and thus tend to scratch the polished surfaces of the conveyor rolls which may cause even more roll imprint to occur on the newly formed glass ribbon.

SUMMARY OF THE INVENTION

It has been found that the conveyor rolls employed in the manufacture of glass by the float process can be substantially maintained in their original condition by periodically brushing them with a rotary driven annular brush which is yieldingly urged against their surfaces. To this end, the cleaning apparatus contemplated by the invention generally comprises a pair of annular wire brushes which are mounted for rotation on a rotary driven shaft that is adapted to be advanced and retracted along a path parallel to the axis of the conveyor rolls. The driven shaft is yieldingly urged toward, and thus the brushes are pushed into engagement with sufficient force against, the surface of the conveyor rolls to remove uneven and crusty deposits therefrom and burnish the surfaces thereof to restore the roll surfaces to substantially their original finish.

OBJECTS AND ADVANTAGES

An object of this invention is to provide a cleaning and burnishing apparatus for restoring the conveyor rolls employed in the float process to substantially their original condition.

Another object of this invention is to provide a cleaning and burnishing apparatus for cleaning the roll surfaces of conveying rolls in situ and while they are transporting glass.

Yet another object of this invention is to yieldingly urge on annular brush ito engagement with the surfaces of conveyor rolls with enough force to remove encrusted deposits therefrom and burnish the surfaces thereof to substantially their original finish.

Other objects and advantages will become more apparent during the course of the following description when taken in connection with the accompanying drawings.

BRIEF DESCRIPTION OF THE DRAWINGS

In the drawings wherein like numerals are employed to designate like parts throughout the same:

FIG. 3 is an enlarged fragmentary side elevational view of a lehr roll cleaning apparatus constructed in accordance with the invention;

FIG. 4 is a plan view of the roll cleaning apparatus shown in FIG. 3;

FIG. 10 is an enlarged cross sectional view taken substantially along line 10—10 in FIG. 6;

FIG. 11 is an enlarged fragmentary side view looking in the direction of line 11—11 in FIG. 10;

FIG. 12 is an enlarged side elevational view of the movable track section shown in FIG. 5; and FIG. 13 is an enlarged fragmentary side elevational view of a coupler connecting the track sections employed in the modified form of the invention.

DESCRIPTION OF THE PREFERRED EMBODIMENTS

Figure 1:
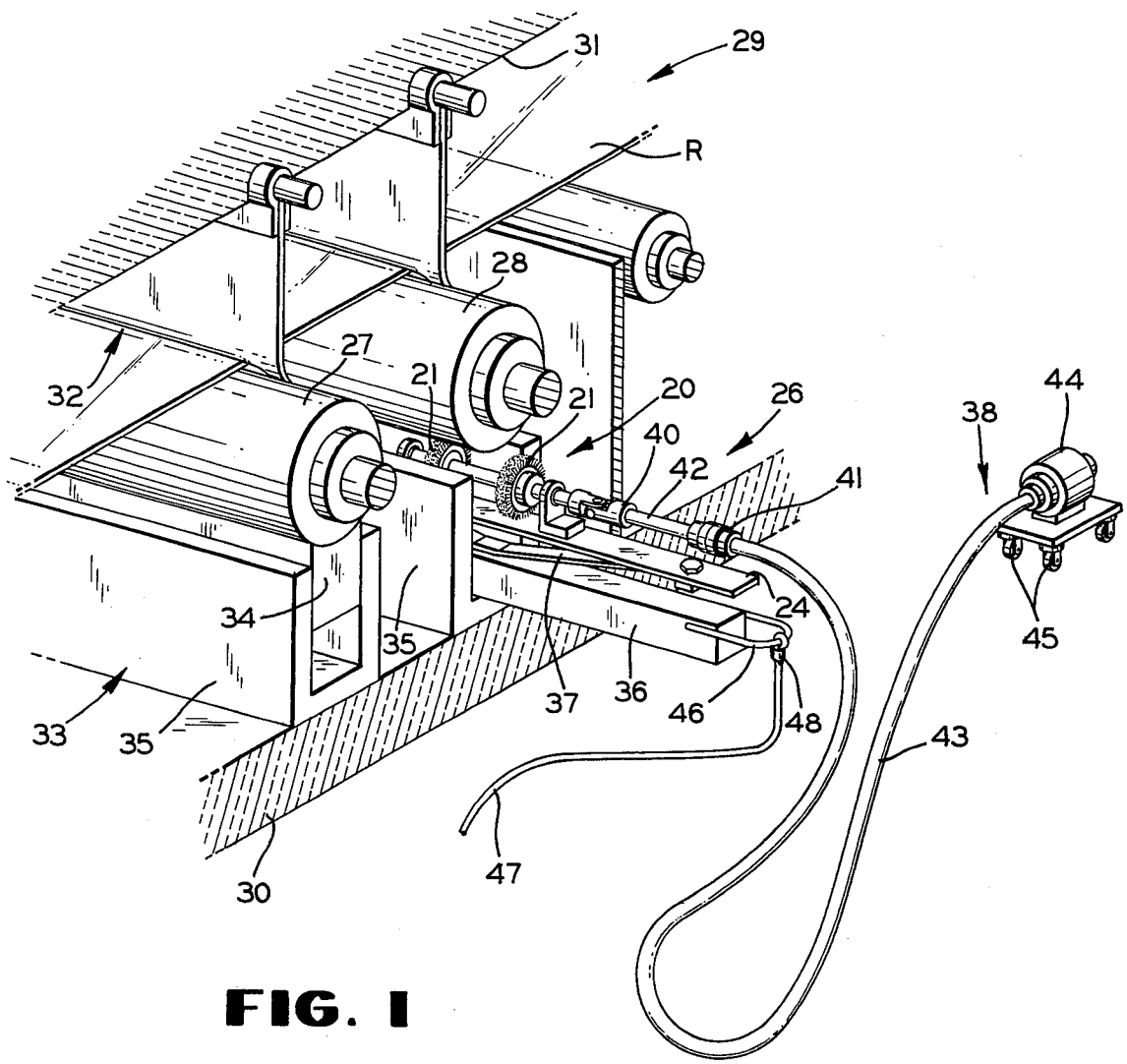
FIG. 1 is a fragmentary perspective view of the discharge end of a float chamber illustrating an embodiment of a lift-out roll cleaning apparatus constructed in accordance with the invention.

Generally speaking, a cleaning and burnishing apparatus according to the invention, which will be described in greater detail hereinafter, includes a rotary driven annular cleaning device generally designated by the reference numeral 20 (see particularly FIGS. 2, 3 and 6), which is yieldingly urged against a conveying roll when it is positioned therebeneath. The cleaning device 20 generally comprises a pair of spaced apart annular elements such as wire brushes 21 mounted for rotation with a driven shaft 22 journalled in a pair of spaced apart, like bearing blocks 23 mounted on a support plate 24 (see FIG. 2) or 24' (see FIGS. 3 and 6) by cap screws 25. Means to be hereinafter described in detail are provided to yieldingly urge the support plate 24 or 24' toward, and thus the brushes 21 into engagement with, one and/or two adjacent conveying rolls.

THE LIFT-OUT ROLL CLEANING EMBODIMENT

Figure 2:
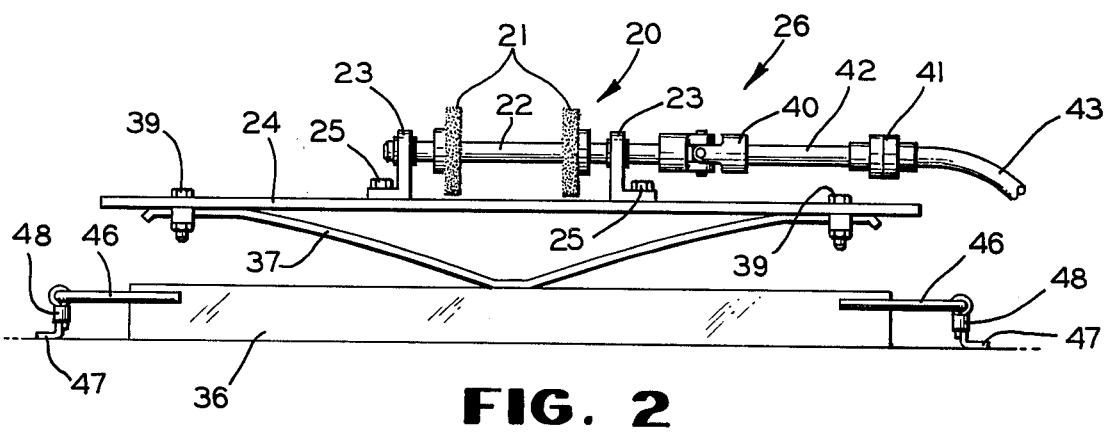
FIG. 2 is an enlarged side elevational view of the cleaning apparatus shown in FIG. 1.

Referring now to the embodiment of the invention illustrated in FIGS. 1 and 2, there is shown a roll cleaning apparatus generally designated in its entirety by the reference numeral 26 for cleaning and burnishing lift-out conveyor rolls 27 and 28 employed to remove a glass ribbon R from a molten metal bath. Either or both of the rolls 27 and 28 may be driven by conventional means (not shown) to apply a tractive force to the glass ribbon R to advance it through the exit throat 29 of a float chamber (not shown).

Thus, in FIG. 1 there is illustrated the exit throat 29 defined by a floor 30 and a roof 31 which contains the lift-out rolls 27 and 28 together with means 32 for sealing the exit throat 29 from the surrounding atmosphere similar to that set forth in U.S. pat. No. 3,674,456, issued on July 4, 1972. In the construction of the seal means 32, it is customary to provide a barrier 33 between the floor 30 and the bottom surface of each of the rolls 27 or 28. Each barrier 33 has a spring loaded carbon member 34 (only one shown) bearing against the bottom surface of the roll 27 or 28 to effect an atmosphere seal beneath the glass ribbon R. The carbon member 34 is contained in the U-shaped element 35 which extends longitudinally along the roll 27 or 28.

In this embodiment of the invention, the U-shaped element 35 also serves as a track for positioning and guiding the cleaning apparatus 26 along a path beneath and parallel to the roll 27 or 28 when its sealing carbon member 34 is removed. Accordingly, the cleaning apparatus 26 includes an elongated slide member 36 configured to slidingly fit within the slot defined by the U-shaped element 35. Thus, the cleaning apparatus 26 includes the annular rotary cleaning and burnishing device 20, the slide member 36 and an inverted elliptical shaped spring 37 disposed between the cleaning and burnishing device 20 and the slide member 36 for yieldingly urging the cleaning and burnishing device 20 against the bottom surface of the roll 27 or 28, together with means 38 for rotatably driving the cleaning device 20.

Referring now to FIG. 2, the inverted elliptical spring 37 is aligned with and mounted as by welding, on the slide member 36 so that its free ends may support the elongated support plate 24. The support plate 24 may be secured to the spring 37 by bolts 39 or some other conventional fastening means. The elliptically shaped spring 37 is designed and dimensioned to yieldingly urge the cleaning and burnishing device 20 against the roll 27 or 28, i.e. in a direction normal to the conveying surface of the roll with enough force so as to with suitable manipulation, remove encrusted deposits therefrom and to burnish the roll surface to substantially its original finish.

The drive means 38 for rotatably driving the shaft 22 generally includes a universal joing 40 affixed to one end of the shaft 22, a coupling 41 connected to the universal joint by a connecting shaft 42, and a flexible drive shaft 43 having one of its ends connected to the coupling 41 and its other end connected to a motor 33 (see FIG. 1), preferably air operated, mounted on casters 45 for portable movement thereof.

In this embodiment of the invention, the annular cleaning device 20 is manually moved to and fro along the bottom surface of the roll 27 or 28 by means of bails 46, one affixed to each end of the slide member 36, and flexible cables 47, a cable 47 being secured to each bail 46 by having one of its ends looped around the bail and clamped to itself as shown at 48 in FIG. 2 whereby the annular cleaning surface device 20 can be pulled in either axial direction.

In the operation of the cleaning apparatus 26, the carbon member 34 is removed from the U-shaped element 35, the cable 47 is threaded through the groove defined by the U-shaped element 35 and the slide member 36 is inserted therein while pushing down on the support plate 24 so that the brushes will be yieldingly urged into engagement with the bottom surface of the roll 27 or 28. It has been found that when the roll 27 or 28 is rotated at a speed equivalent to a glass speed of 600 inches per minute, the air pressure operating the air motor 44 is about 95 pounds per square inch and the brushes are moved along the roll 27 or 28 at a linear speed of 13 inches per minute, the encrusted deposits formed on the roll 27 or 28 will be removed and the roll surface will be burnished to its substantially original finish without scratching the roll. Also, as can be seen in FIG. 1, the roll 27 or 28 may be cleaned while a glass ribbon R is being removed from the molten metal bath without interruption of normal operations.

THE LEHR ROLL CLEANING EMBODIMENTS

Figure 5:
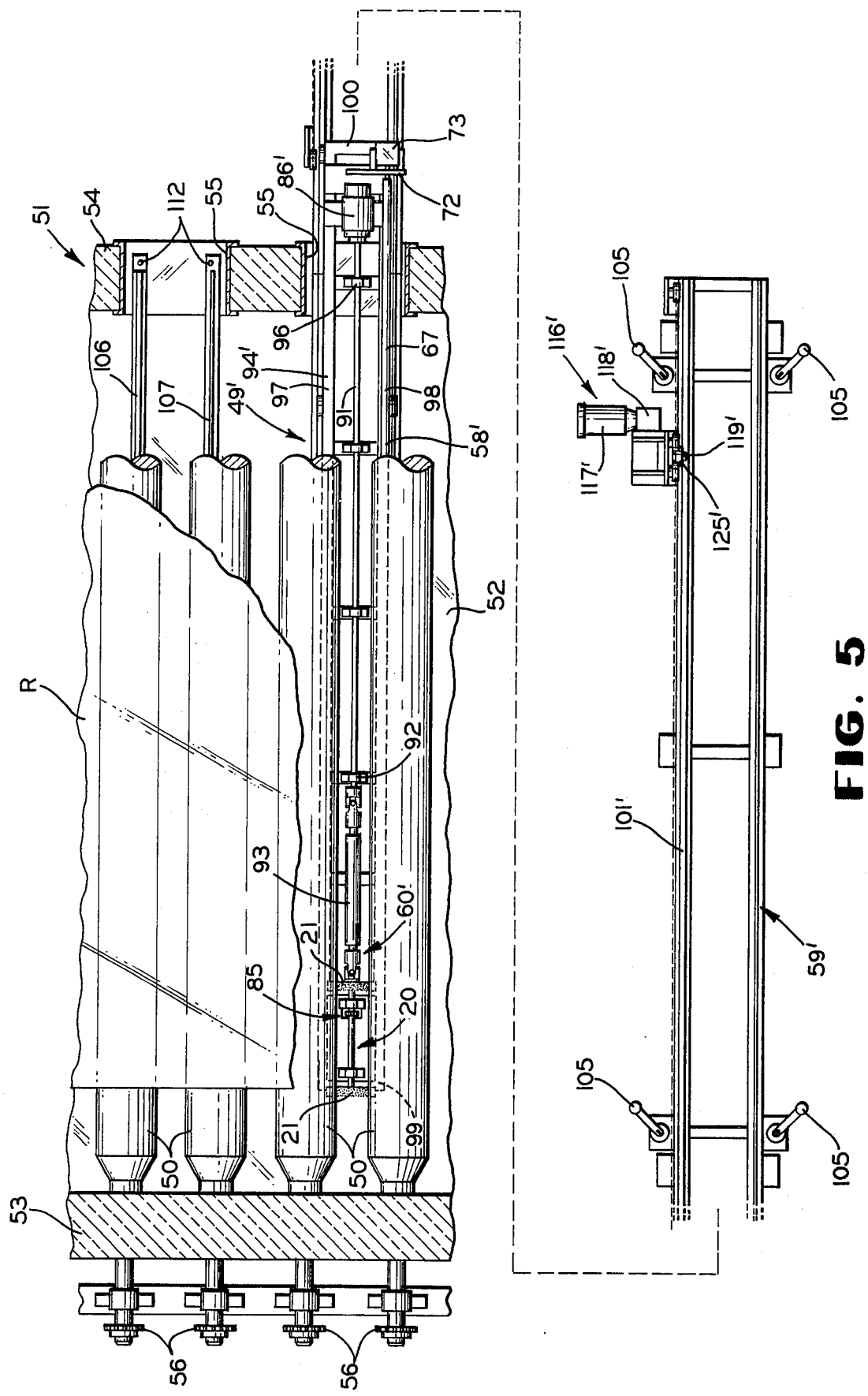
FIG. 5 is a composite plan view of a modified form of the lehr roll cleaning apparatus constructed in accordance with this invention.

Referring now to the embodiments of the invention illustrated in FIGS. 3 and 4, and FIGS. 5 through 13, there is shown roll cleaning apparatus generally designated in their entirety by the reference numerals 49 and 49' respectively, for cleaning and burnishing horizontally disposed conveying rolls 50 employed to advance the glass ribbon R through an annealing lehr 51. The roll cleaning apparatus 49 shown in FIGS. 3 and 4 is particularly adapted for cleaning the lehr rolls when the lehr 51 is not in operation annealing glass and, the roll cleaning apparatus 49' is for cleaning the lehr rolls when the lehr 51 is in operation annealing glass. Thus, as best shown in FIGS. 3 and 5, there is illustrated a portion of the annealing lehr 51 comprising a floor 52, side walls 53 and 54, the side wall 54 being provided with a series of longitudinally spaced clean-out openings 55 located at the level of the lehr floor 52, and a mechanical conveying system including a series of the conveying rolls 50 which are spaced apart and parallel to each other. Each roll 50 is rotatably driven in a conventional manner by a drive sprocket 56 (see FIG. 5) for advancing the glass ribbon R through the lehr 51. The cleaning apparatus 49 or 49' is a mobile unit and is moved into the interior of the lehr 51 beneath and/or between adjacent pairs of the conveying rolls 50 through the clean-outs openings 55.

Generally speaking, the cleaning apparatus 49 or 49' comprises the annular cleaning device 20, an elevating means or mechanism 57 that is capable of raising and yieldingly urging the cleaning device 20 into engagement with the surfaces of the rolls 50 in a direction normal to the cylindrical surfaces of the rolls 50 from its normal position; a carriage 58 or 58' for supporting the cleaning device that is reciprocably movable along a mobile track unit 59 or 59' and rotary drive means 60 or 60' for rotatably driving the annular cleaning device 20.

Figure 6:
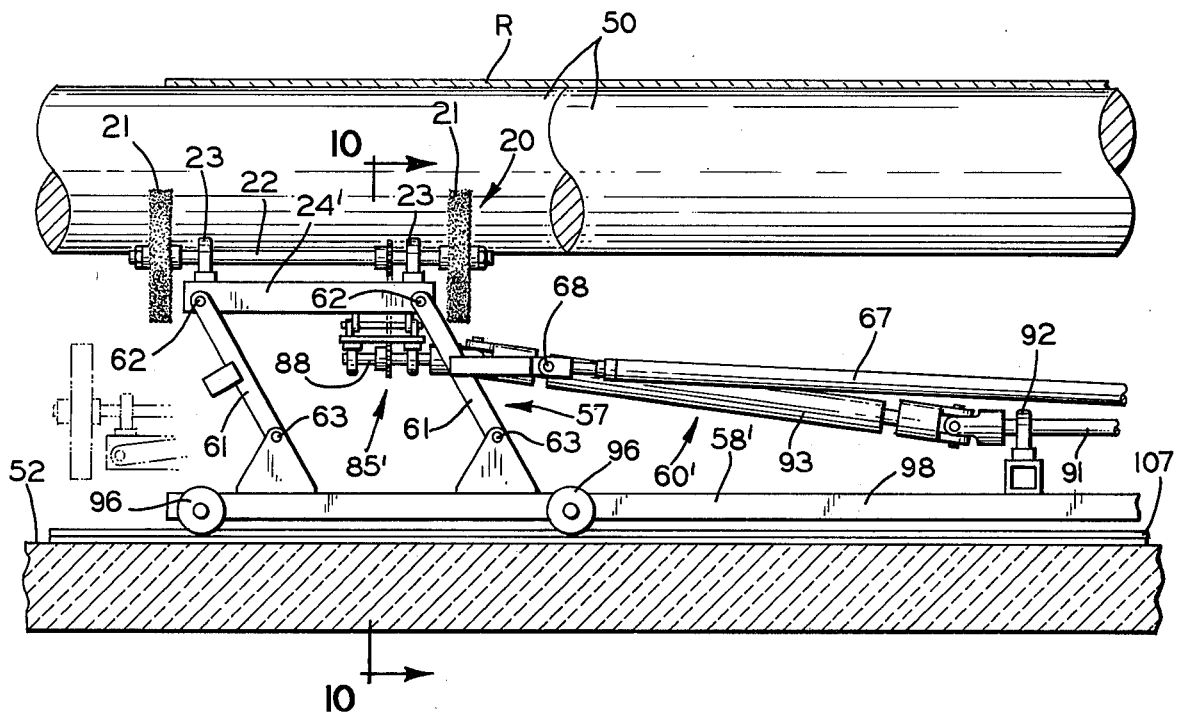
FIG. 6 is an enlarged fragmentary side elevational view of the modified form of the lehr roll cleaning apparatus shown in FIG. 5.

Referring more particularly to FIGS. 3 and 6, the elevator or raising mechanism 57 comprises four similar swingable links 61, one being provided at each corner of the support plate 24' and each having one of its ends pivotally connected thereto as shown at 62. The other end of each link 61 is pivotally connected to the carriage 58 or 58' as shown at 63. Thus, the support plate 24' is movable from its normal position to a raised position when the links 61 are swung about their pivots.

In the embodiment of the invention illustrated in FIGS. 3 and 4, the cleaning device 20 is moved from its normal or lower position as shown in dotted lines whereat it may pass through the openings 55, to its raised position by a pair of conventional power cylinders 64. The cylinder end of each power cylinder 64 is pivotally connected to the carriage 58 as shown at 65 and the piston end is pivotally connected to a cross-shaft 66 secured to and intermediate the ends of a pair of opposite links 61. The piston end of the power cylinder 64 is shown in its extended position. Thus, when it is retracted it causes the links 61 connected thereto to swing downwardly and move the cleaning device 20 to its lower position.

Figure 7:
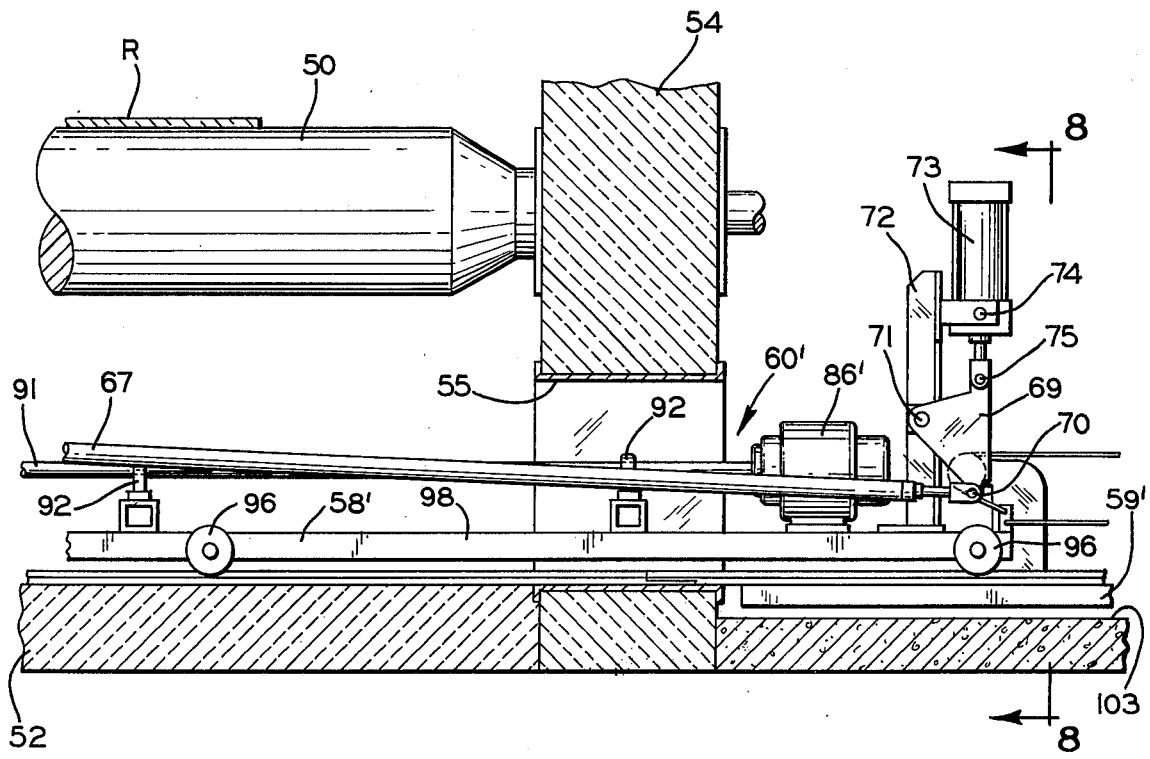
FIG. 7 is a continuation of the side view shown in FIG. 6.
Figure 8:
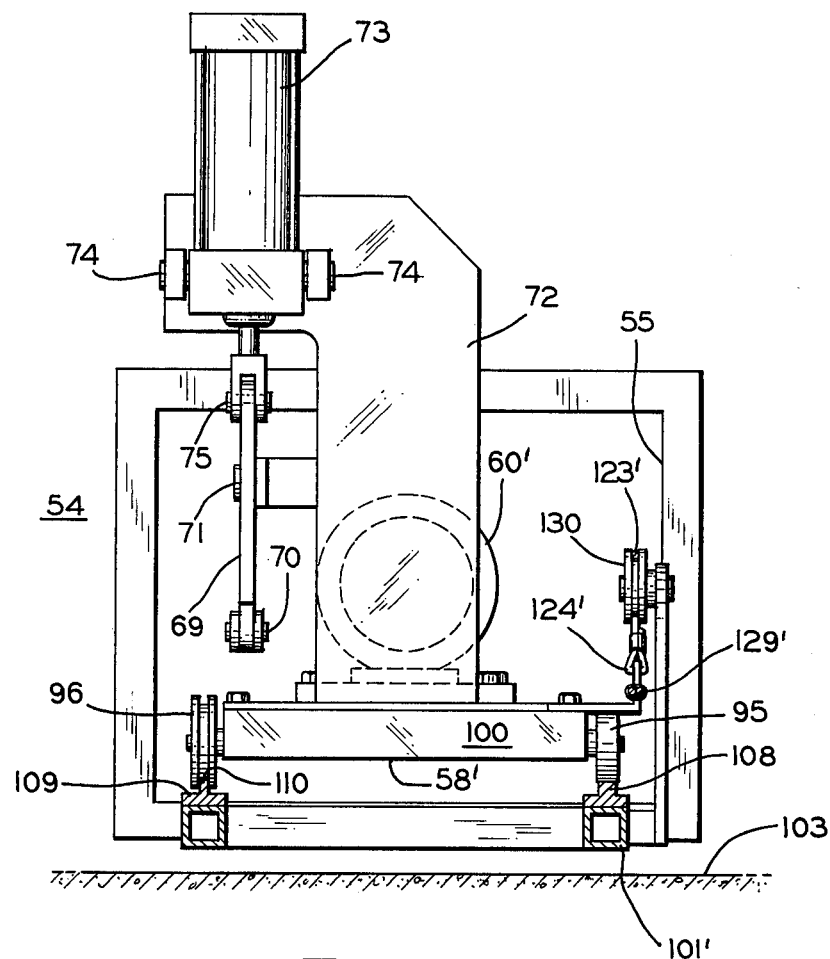
FIG. 8 is an enlarged end view looking in the direction of lines 8—8 in FIG. 7.

In the modified cleaning apparatus 49', as best shown in FIGS. 6 and 7, the cleaning device 20 is moved from its lower position as shown in dotted lines whereat it can pass through the clean-out openings 55 to its raised position as shown in full lines, by a pull shaft 67 whose one end is hingedly connected as at 68 to a link 61 (see FIG. 6), while its opposite end is pivotally connected to a crank plate 69 as indicated by the reference numeral 70 (see FIG. 7). The crank plate 69 is pivotally connected as at 71 to an upstanding pedestal 72 affixed to the end of the carriage 58' opposite the end supporting the cleaning device 20. The crank plate 69 is oscillated about its pivot 71 by a doubleacting power cylinder 73 whose cylinder end is pivotally connected as at 74 to the pedestal 72 (see also FIG. 8). The piston end of the power cylinder 73 is pivotally connected to the crank plate 69 as indicated by the reference numeral 75. In FIG. 7 the piston end of the power cylinder 73 is shown in its retracted position. As will be apparent, when the piston is extended it will cause the crank plate 69 to move about its pivot 71 and move the pull shaft 67 in a direction to swing the link 61 downwardly and move the cleaning device 20 to its lower position.

Figure 9:
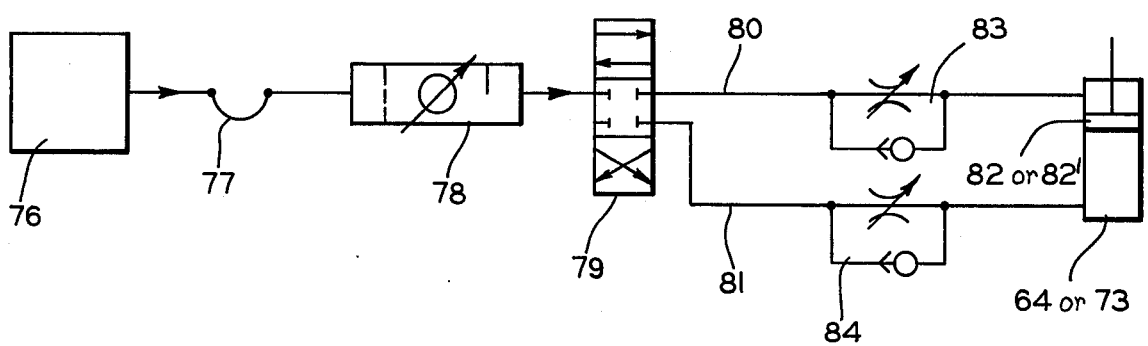
FIG. 9 is a schematic diagram of an air control system.

As previously mentioned, an important aspect of the invention is to yieldingly urge the annular cleaning device 20 along a path extending perpendicular to the axes of the conveying rolls 50 and against the surface of the rolls and, in these embodiments of the invention, this is accomplished by controlling the flow of fluid to and from the power cylinder 64 or 73. Thus, as schematically illustrated in FIG. 9, the flow of fluid to and from the power cylinder 64 or 73 is regulated by a control system comprising a source 76 of fluid under pressure which is communicable with the power cylinder via a flexible hose 77 connected to a combination filter, regulator and lubricator unit 78 and a hand controlled directional valve 79. Branch lines 80 and 81 conduct fluid pressure from the directional flow valve 79 to either side of the piston 82 or 82' of the power cylinder 64 or 73 through line flow control valves 83 or 84, respectively. With this arrangement of the fluid pressure control units, the line flow control valves 83 and 84 function equivalent to the elliptical spring 37 in the previously described embodiment; that is, to yieldingly urge the wire brushes 21 against the surface of the rolls 50.

Referring now to FIGS. 3, 6, 7 and 10, the rotary drive means 60 or 60' generally comprises a chain and sprocket mechanism 85 or 85' which is operatively connected to the brush mounting shaft 22 and driven by a motor 86 (see FIG. 3) or 86' (see FIG. 7) preferably an air motor. In the embodiment of the invention illustrated in FIG. 3, the motor 86 is hingedly connected (not shown) to the bottom of the support plate 24' and its output shaft 83 is connected directly to the chain and sprocket mechanism 85. The motor hinge mounting is for adjusting the tension of the chain of the mechanism 85 and is not a feature of this invention. Thus, a more detailed description is not deemed necessary.

In the embodiment of the invention shown in FIGS. 5 through 13 it is necessary, for the efficient operation of the motor 86', to locate the motor exteriorly of the lehr 51 due to the relatively high temperatures within the operating lehr. Thus, as best shown in FIG. 5, the motor 86' is mounted on the end of the carriage 58' projecting outside the lehr wall 54. In this case, as illustrated in FIGS. 10 and 11, the chain and sprocket mechanism 85' is driven by an intermediate shaft 88 journalled in bearings 89 located on the lower surface of a plate 90 hingedly mounted (see FIG. 10) from the bottom of the support plate 24' for adjusting the tension of the chain of the mechanism 85'. Referring now to FIGS. 6 and 7 the shaft 88, and thus the brush shaft 22, is rotatably driven by the motor 86' which is drivingly connected to an end of the shaft 88 by a jack shaft 91 journalled in bearings 92 mounted on the carriage 58' via a universal drive shaft 93.

The carriage 58 or 58' generally comprises a rectangular base or frame 94 or 94' (see FIGS. 4 and 5, respectively) supported by a plurality of smooth surfaced wheels 95 spaced along one side thereof and a plurality of grooved surface wheels 96 spaced along the opposite side thereof (see FIG. 10), the purpose of which will be described hereinafter. Referring now to FIGS. 3 and 4, the carriage 58 includes the base 94 which only need be large enough in size to support the raising and lowering mechanism 57, the power cylinders 64, two of the smooth surfaced wheels 95, one mounted at each corner on one side of the base 94, the two of the grooved surface wheels 96 mounted on the opposite side of the carriage 58 in opposed relation to the wheels 95. The carriage 58' shown in FIGS. 5, 6 and 7, includes the base 94' composed of elongated side members 97 and 98 and end cross members 99 and 100, four of the smooth surfaced wheels 95 spaced along the side member 97, and four of the grooved surface wheels 96 spaced along the side member 98 in opposed relation to the wheels 95. The carriage 58' is of sufficient length so that the end 100 supporting the motor 86' and the power cylinder 73 is always located exteriorly of the lehr wall 54 when the cleaning device 20 is positioned at the end of the conveyor roll 50 adjacent the lehr wall 53.

The mobile track unit 59 (see FIGS. 3 and 4) and 59' (see FIGS. 5 and 12), each generally comprises an elongated rectangular frame 101 or 101', respectively, which is mounted on casters 102 and thus can be moved along a factory floor 103 or the lehr floor 52. The casters 102 at each corner of the track unit 59 are provided with brakes or locks 104 so that when the track unit 59 has been rolled in place within the lehr 51 beneath or between a pair of conveying rolls 50 and aligned in a path parallel thereto, it can be held stationary and the carriage 58 can be moved to and fro along a path parallel to the conveyor rolls 50. The mobile track unit 59' as illustrated in FIGS. 5 and 12, includes jack means or floor locks 105 of which there are four, two for each side of the frame 101'. Thus, when the track unit 59' has been rolled into place adjacent one of the clean-out openings 55 as illustrated at FIG. 5, the jack means 105 are operated to lift and hold the unit 59' in alignment with a pair of tracks 106 and 107 (see FIG. 5) affixed to he lehr floor 52 in parallel relation to the axes of the conveyor rolls 50. The tracks 106 and 107 are provided so that only the annular cleaning device 20 on the carriage 58' is positioned within the lehr 51 when glass is being annealed.

Each mobile track unit 59 or 59' includes a pair of elongated track members 108 and 109 which are affixed to the opposite sides of the frame 101 or 101', respectively, as by welding. The track 108 and also the track 106 has a flat surface upon which the wheels 95 of the carriage 58 or 58' ride (see FIG. 8) while the track 109 and also the track 107 has a relatively narrow upstanding portion 110 which extends into the grooves of the wheels 96 to restrain and guide the carriage 58 or 58= as it moved along the mobile track unit 59 or 59'. The ends of the fixed track members 106 and 107 adjoining the ends of the track members 108 and 109 of the mobile unit 59' are provided with means to couple them together. Thus, as illustrated in FIG. 13, the end of the track member 107 is provided with upwardly facing recessed portion 111 having an upright peg 112 and the end of the track member 109 is provided with a downwardly facing recessed portion 113 having an aperture 114 in which the peg 112 extends to couple the track members 107 and 109 together. Likewise, the adjoining ends of the track members 106 and 108 are coupled to each other.

The means for moving the carriage 58 or 58' to and fro along the track unit 59 or 59' and the fixed tracks 106 and 107 mounted on the lehr floor 52, generally comprises a cable and pulley mechanism 115 or 115' which is connected to the carriage and driven by a reversing drive unit 116 or 116'. Referring now to FIGS. 3 and 4, the reversing drive unit 116 comprises a reversible drive motor 117 and a reduction unit 118 mounted on one end of the frame 101 of the mobile unit 59 wherein its output shaft 119 is connected by a chain and sprocket mechanism 120 to a jack shaft 121 rotatably journalled in bearings 122 secured to the frame 101. A cable 123 having one of its ends connected as at 124 to one end of the carriage 58, is entrained over a drive pulley 125 keyed for rotation with the jack shaft 121 then entrained over an idler pulley 126 keyed for rotation with an idler shaft 127 rotatably journalled in bearings 128 secured to the opposite end of the frame 101 and then connected as at 129 to the opposite end of the carriage 58. Thus, when the motor 117 is energized, the cable 123 may be moved in either direction along a linear path to pull the carriage 58 along the mobile track unit 59.

Referring now to FIGS. 5 and 12, the reversing drive unit 116' comprises a reversible drive motor 117' and a reduction unit 118' having an output shaft 119' which is mounted along one side of the frame 101'. A cable 123' having one of its ends connected as at 124' to one end of the carriage 58', is entrained over an idler pulley 130 mounted at the end of the frame 101', an idler pulley 131 mounted adjacent a drive pulley 125' keyed for rotation with the output shaft 119', around the drive pulley 125', over an idler pulley 132, around idler pulleys 133 and 134 mounted at the opposite end of the frame 101', and then is connected as at 129' to the carriage 58' adjacent the connection 124'. Thus, when the motor 117' is energized, the cable 123' may be moved in either direction in a linear path to pull the carriage 58' along the mobile track unit 59' and the fixed tracks 107 and 108 within the lehr 51 when the mobile track unit is connected thereto.

The invention above described provides a novel apparatus for cleaning and burnishing the surfaces of conveyor rolls in situ. Also, it is no longer necessary to hold up production of flat glass to clean the lift-out rolls or the lehr conveyor rolls, nor is it necessary to remove the rolls from their operating positions. This is highly advantageous in the manufacture of flat glass in that the rolls can be cleaned and burnished without in any way interferring or interrupting the continuous process of manufacturing flat glass by the float process.

It is to be understood that the forms of the invention herewith shown and described are to be taken as illustrative embodiments only of the same and that various changes in the shape, size and arrangement of parts may be resorted to without departing from the spirit of the invention.

We claim:

1. A cleaning apparatus for removing uneven and crusty deposits from and burnishing the cylindrical surfaces of conveyor rolls which support and convey a ribbon of glass in a direction transverse to the axes of the rolls, said apparatus comprising:

a. a support plate;

b. an annular cleaning device mounted on said support plate and engageable with the cylindrical surfaces of said conveyor rolls;

c. means for rotating said annular cleaning device; and d. means for yieldingly urging said support plate in a direction perpendicularly to said conveying rolls and said annular cleaning device into engagement with the conveying surfaces of said rolls.

2. A cleaning apparatus for removing uneven and crusty deposits from and burnishing the surfaces of conveyor rolls as claimed in claim 1, including means for moving said cleaning device into and out of engagement with the cylindrical surfaces of said conveyor rolls.

3. A cleaning apparatus for removing uneven and crusty deposits from and burnishing the surfaces of conveyor rolls as claimed in claim 2, wherein said moving means comprises an elevating means and a fluid operated power cylinder for moving said elevating means toward said conveyor rolls, said moving means including control means for regulating the flow of pressure to and from said power cylinder.

4. A cleaning apparatus for removing uneven and crusty deposits from and burnishing the surfaces of conveyor rolls as claimed in claim 1, wherein said yieldingly urging means comprises a leaf spring.

5. A cleaning apparatus for removing uneven and crusty deposits from and burnishing the surfaces of conveyor rolls as claimed in claim 1, wherein said conveyor rolls are elongated and including means for reciprocably moving said cleaning device along the cylindrical surfaces of said elongated conveyor rolls.

6. A cleaning apparatus for removing uneven and crusty deposits from and burnishing the cylindrical surfaces of conveyor rolls disposed in a horizontal plane which support and convey a ribbon of glass in a direction transverse to the axes of the rolls, said apparatus comprising:

a. a rotary horizontally disposed shaft positionable parallel to the axes of said conveyor rolls;

b. means for rotatably driving said shaft;

c. at least one annular cleaning element mounted on and rotatable with said shaft and engageable with the cylindrical surfaces of said rolls beneath the level of said glass ribbon; and d. means for yieldingly urging said shaft toward and thus said at least one cleaning element along a path extending perpendicular to and into engagement with the cylindrical surfaces of said conveyor rolls.

7. A cleaning apparatus for removing uneven and crusty deposits from and burnishing the cylindrical surfaces of conveyor rolls as claimed in claim 6, wherein said yieldingly urging means comprises a leaf spring.

8. A cleaning apparatus for removing uneven and crusty deposits from and burnishing the cylindrical surfaces of conveyor rolls as claimed in claim 6, wherein said yieldingly urging means comprises an elevating means, at least one fluid operated power cylinder for operating said elevating means and control means including means for regulating the flow of pressure to and from said power cylinder.

9. A cleaning apparatus for removing uneven and crusty deposits from and burnishing the cylindrical surfaces of conveyor rolls as claimed in claim 6, wherein said rotatable driving means comprises a motor and said annular cleaning element comprises a wire brush.

10. A cleaning apparatus for removing uneven and crusty deposits from and burnishing the cylindrical surfaces of conveyor rolls as claimed in claim 6, including a carriage for movably supporting said shaft, and means for reciprocably moving said carriage along a path parallel to the axes of said conveyor rolls.

11. A cleaning apparatus for removing uneven and crusty deposits from and burnishing the cylindrical surfaces of conveyor rolls disposed in a horizontal plane which supports and conveys a ribbon of glass in a direction transverse to the axes of the rolls, said apparatus comprising:

a. a rotary horizontally disposed shaft positionable parallel to the axes of said rolls;

b. a motor operatively connected to and drivingly rotating said shaft;

c. at least one annular wire brush mounted on and rotatable with said shaft and engageable with the cylindrical surfaces of said rolls beneath the level of said glass ribbon;

d. a slide member for supporting and moving said shaft to and fro relative to said conveyor rolls; and e. a leaf spring disposed between and connected to said shaft and said slide member for yieldingly urging said wire brush in a direction normal to and into engagement with the cylindrical surfaces of said conveyor rolls.

12. A cleaning apparatus for removing uneven and crusty deposits from and burnishing the cylindrical surfaces of conveyor rolls disposed in a horizontal plane which support and convey a ribbon of glass in a direction transverse to the axes of the rolls, said apparatus comprising:

a. a rotary horizontally disposed shaft positionable parallel to the axes of said rolls;

b. a motor drivingly connected to and rotating said shaft;

c. at least one annular wire brush mounted on and rotatable with said shaft and engageable with the cylindrical surfaces of said rolls beneath the level of said glass ribbon;

d. an elongated mobile track unit for placing said shaft in the position parallel to said conveyor rolls;

e. a carriage rollable to and fro along said mobile track unit;

f. an elevating means operatively connected between said rotatable shaft and said carriage for moving said shaft toward and away from said rolls along paths extending perpendicular thereto;

g. at least one fluid operated power cylinder operatively connected to said elevating means for raising and lowering said elevating means relative to said conveyor rolls;

h. a source of fluid pressure operatively connected to said power cylinder; and i. control means for regulating the flow of fluid to and from said power cylinder for yieldingly urging said at least one wire brush into engagement with the cylindrical surfaces of said conveyor rolls.

13. A cleaning apparatus for removing uneven and crusty deposits from and burnishing the cylindrical surfaces of said conveyor rolls as claimed in claim 12, wherein said control means includes a pair of fluid conducting branch lines, one connected to each end of said power cylinder and each branch line includes a pressure flow control valve for controlling the flow of pressure to and from said power cylinder.

14. In combination, a float chamber having an exit throat and a plurality of conveyor rolls disposed in a horizontal plane which support and convey a ribbon of glass in a direction transverse to the axes of the rolls and a cleaning apparatus for individually removing uneven and crusty deposits from and burnishing the cylindrical surfaces of said conveyor rolls, said apparatus comprising:
 a. a rotary horizontally disposed shaft positionable parallel to the axes of said rolls;
 b. a motor operatively connected to and drivingly rotating said shaft;
 c. at least one annular wire brush mounted on and rotatable with said shaft and engageable with the cylindrical surfaces of said rolls beneath the level of said glass ribbon;
 d. a plurality of upstanding U-shaped elements extending parallel to the axes of said rolls, one being mounted on the floor of said exit throat beneath each roll of said plurality of rolls;
 e. a slide member positionable in a said upstanding element for supporting and reciprocably moving said shaft relative to a roll of said plurality of conveyor rolls; and
 f. a leaf spring disposed between and connected to said shaft and said slide member for yieldingly urging said wire brush in a direction normal to and into engagement with the cylindrical surface of the said conveyor roll.

15. In combination, an annealing lehr having a floor and a plurality of conveyor rolls disposed in a horizontal plane which support and convey a ribbon of glass in a direction transverse to the axes of said rolls and a cleaning apparatus for removing uneven and crusty deposits from and burnishing the cylindrical surfaces of said conveyor rolls, the combination comprising:
 a. a fixed track section mounted on the floor of said lehr between and parallel to the axes of a pair of said conveyor rolls;
 b. a mobile track unit;
 c. means for connecting an end of said mobile track unit to said fixed track unit;
 d. an elongated carriage reciprocably rollable along said mobile track unit having a portion extending outside of said lehr;
 e. a rotary, horizontally disposed shaft supported by said carriage adjacent the end opposite said outside portion of said carriage;
 f. a motor drivingly connected to and rotating said shaft and supported on said outside portion of said carriage;
 g. at least one annular wire brush mounted on and rotatable with said shaft and engageable with the cylindrical surfaces of said rolls and beneath the level of said glass ribbon when said opposite end of said carriage extends within said lehr on said fixed track section;
 h. an elevating means operatively connected between said rotatable shaft and said carriage;
 i. at least one fluid operated power cylinder mounted on said outside portion of said carriage and operatively connected to said elevator for raising and lowering said shaft relative to said conveyor rolls;
 j. a source of fluid pressure operatively connected to said power cylinder; and
 k. control means regulating the flow of fluid under pressure to and from said power cylinder for yieldingly urging said at least one annular wire brush into engagement with the cylindrical surfaces of said conveyor rolls.

* * * * *